(No Model.) 4 Sheets—Sheet 1.

W. E. PENN.
CHURN AND BUTTER WORKER.

No. 565,791. Patented Aug. 11, 1896.

Witnesses. Inventor.

(No Model.)  4 Sheets—Sheet 2.

W. E. PENN.
CHURN AND BUTTER WORKER.

No. 565,791. Patented Aug. 11, 1896.

Witnesses.  Inventors.
C. N. Keeney.  William E. Penn
Anna V. Faust.  By Benedict Morsell
  Attorneys.

(No Model.) 4 Sheets—Sheet 3.

W. E. PENN.
CHURN AND BUTTER WORKER.

No. 565,791. Patented Aug. 11, 1896.

Witnesses.
Inventors.
William E. Penn
By Benedict Morsell
Attorneys.

(No Model.)  
4 Sheets—Sheet 4.

W. E. PENN.
CHURN AND BUTTER WORKER.

No. 565,791. Patented Aug. 11, 1896.

Witnesses:  
C. N. Kiney.  
Anna P. Faust.

Inventor:  
William E. Penn  
By Benedict & Morsell  
Attorneys.

UNITED STATES PATENT OFFICE.

WILLIAM E. PENN, OF LAKE MILLS, WISCONSIN, ASSIGNOR TO THE F. B. FARGO & COMPANY, OF SAME PLACE.

CHURN AND BUTTER-WORKER.

SPECIFICATION forming part of Letters Patent No. 565,791, dated August 11, 1896.

Application filed September 6, 1895. Serial No. 561,712. (No model.)

*To all whom it may concern:*

Be it known that I, WILLIAM E. PENN, of Lake Mills, in the county of Jefferson and State of Wisconsin, have invented a new and useful Improvement in Churns and Butter-Workers, of which the following is a description, reference being had to the accompanying drawings, which are a part of this specification.

My invention relates to a machine that is adapted to be used both as a churn and as a butter-worker, the machine being so constructed that it can be used first for churning the milk, and thereafter, under certain shifted and different relations of the mechanical parts, can be used for working the butter.

These machines are mostly used in creameries, where large supplies of milk are operated on, and are therefore desirably of large size and adapted to hold and operate on several barrels of milk. The strain on so large a machine containing such a quantity of milk or the butter therefrom and the power required to operate the mechanism with such a load are also necessarily very considerable, and the construction of the machine must therefore, to enable it to do its work satisfactorily, be so suitably proportioned, arranged, and disposed as to apply the power and operative force in such manner as to obtain desirable mechanical movements and required action on the material to produce the best results and to obviate twisting strain or breakage of the parts of the mechanism.

The object of the present improvements is to provide mechanism so constructed, arranged, and disposed as to accomplish these objects most satisfactorily.

The invention consists in the mechanism, its parts and combination of parts, as hereinafter described and claimed, or their equivalents.

Figure 1:
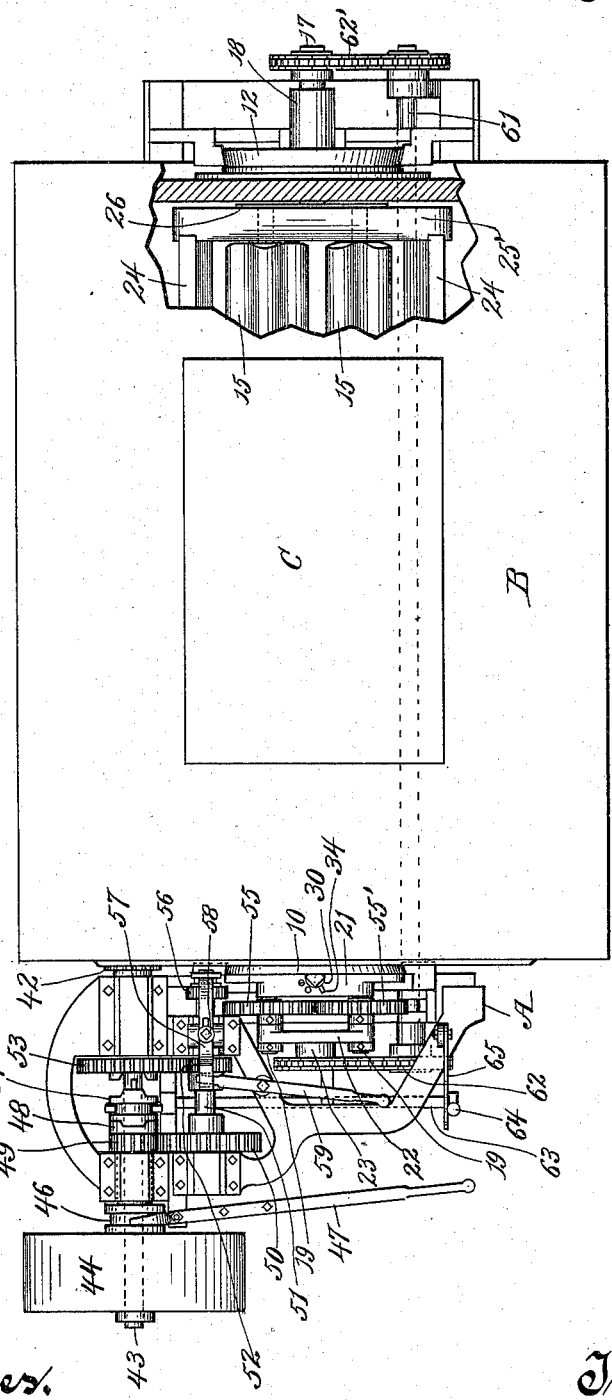
Figure 2:
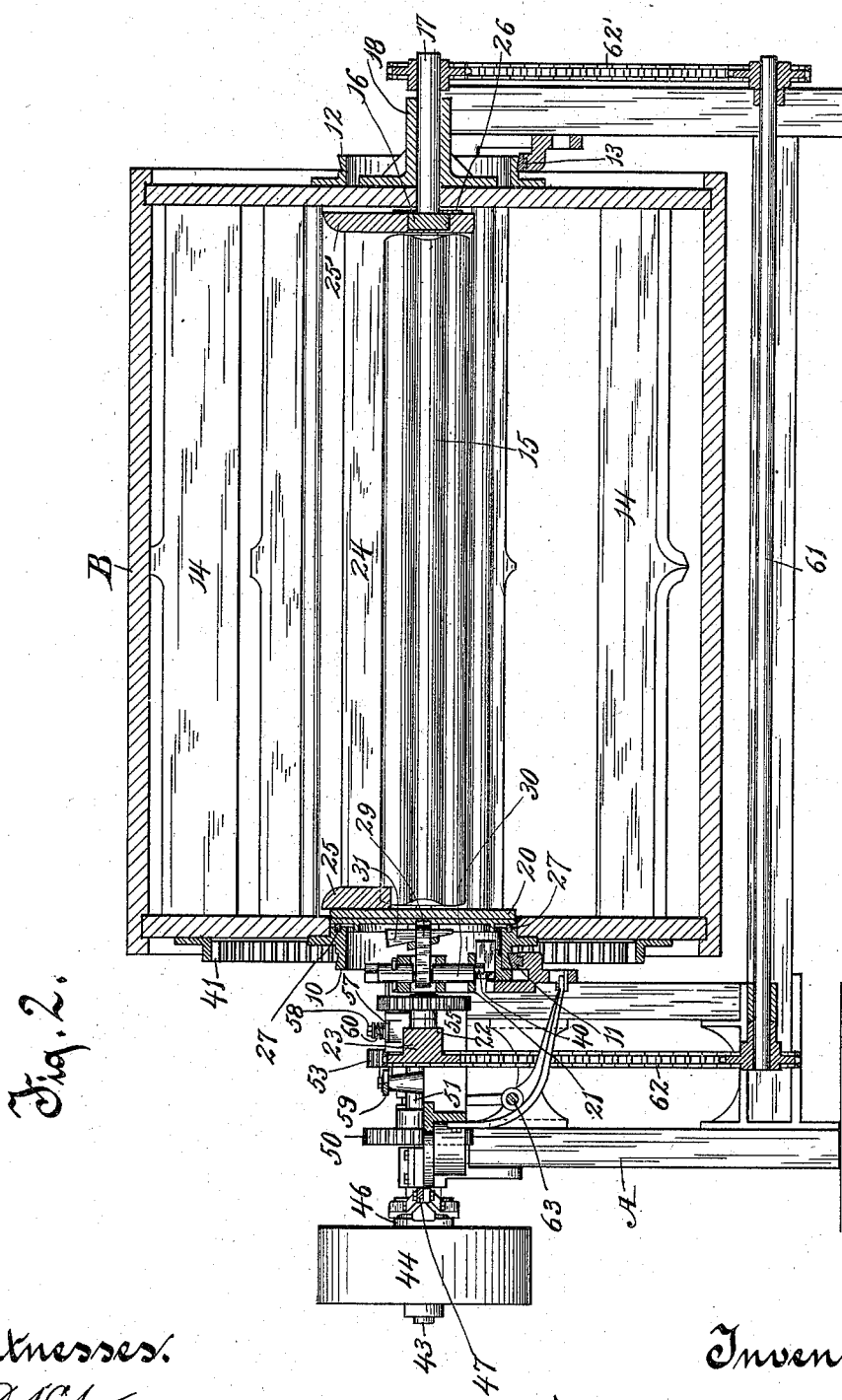
Figure 3:
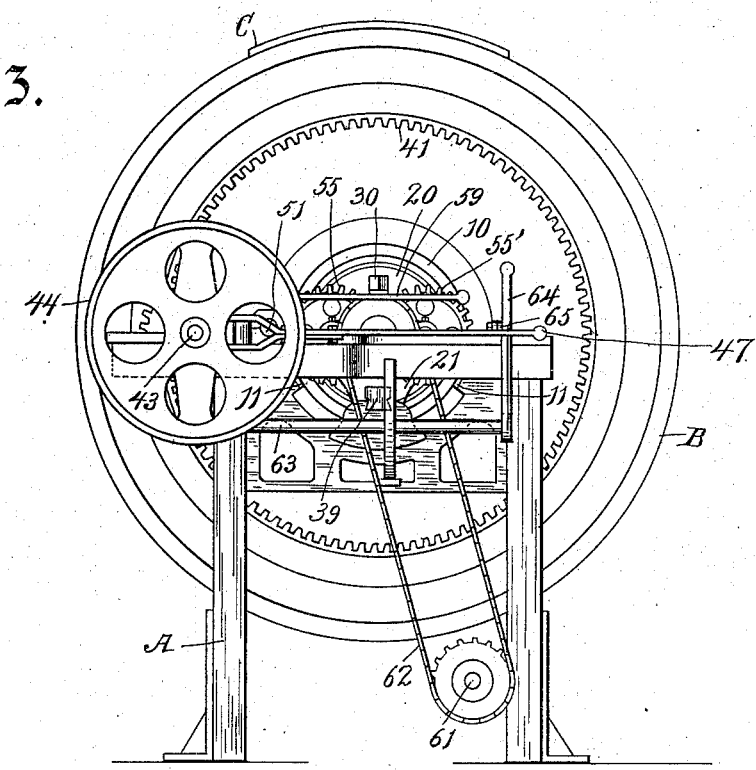
Figure 4:
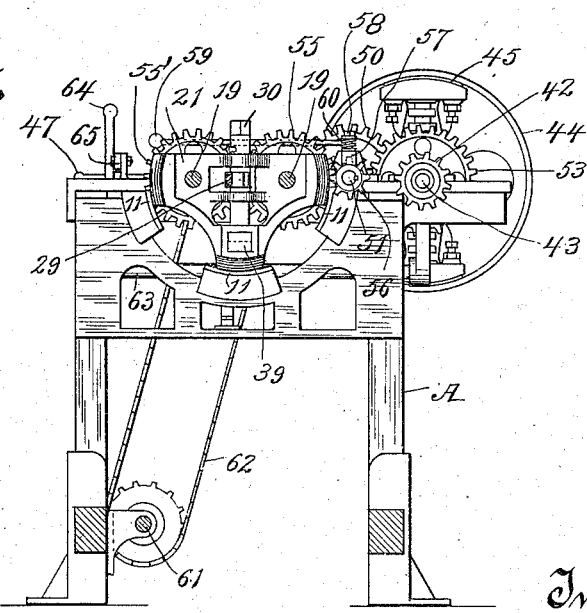
Figure 5:
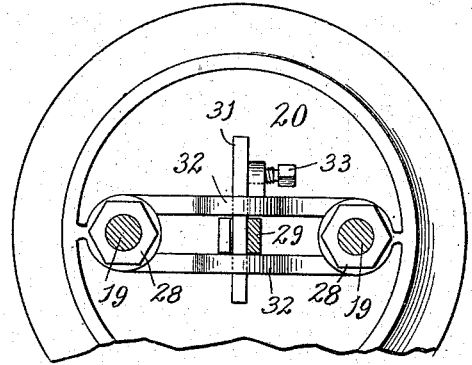
Figure 6:
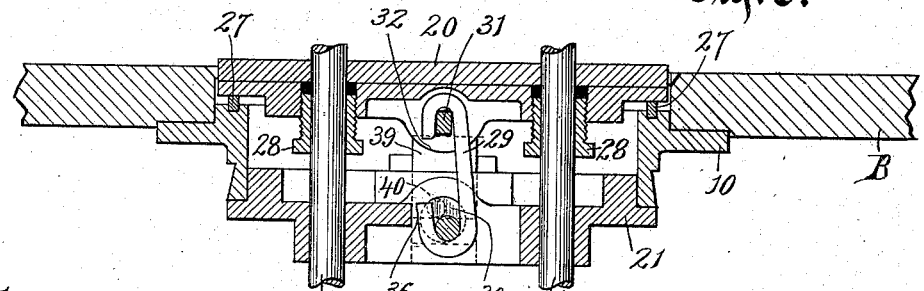
Figure 8:
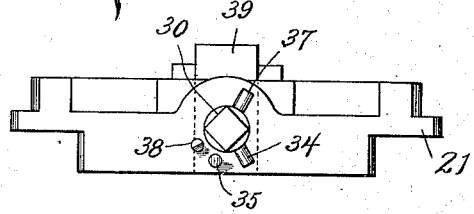
Figure 9:
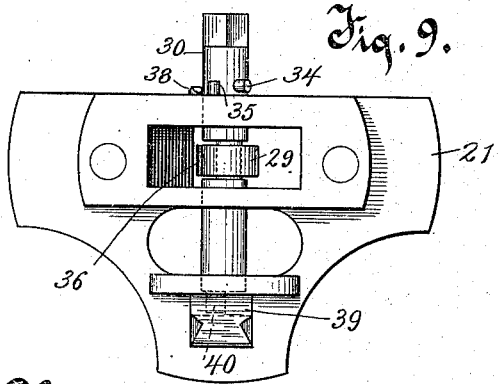
Figure 7:
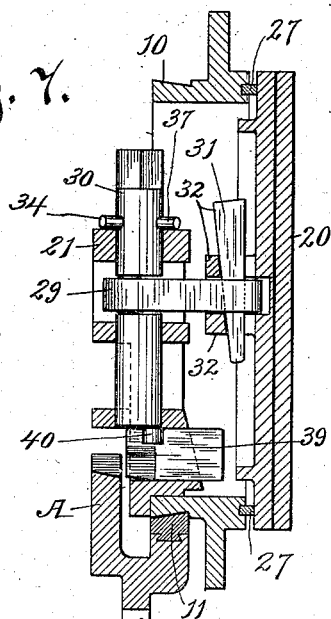

In the drawings, Figure 1 is a top plan view of the complete machine, a portion of the drum being broken away to exhibit interior construction. Fig. 2 is an elevation of the complete machine, the drum and some parts of the mechanism being in longitudinal section. Fig. 3 is an elevation of the front end of the machine. Fig. 4 is an elevation of mechanism at the front end of the machine, as seen at that end which is adjacent to the drum. Fig. 5 is an elevation of a fragment of the central partial front head of the drum, showing also other devices connected thereto. Fig. 6 is a transverse section of the central portion of the front head of the drum and of devices related thereto. Fig. 7 is a transverse section of substantially the same members shown in Fig. 6, the section being at a right angle to the section seen in Fig. 6. Figs. 8 and 9 are an edge and a face view, respectively, of the spider and allied parts, mostly in section in Figs. 6 and 7.

In the drawings, A is a frame of suitable size and form to support the operative mechanism.

B is a cylindrical drum to hold the material, either milk or butter, to be operated on. The drum is provided with a door C in its periphery through which to insert the material to be operated on and to remove its product.

The front head of the drum is provided with a central aperture of considerable diameter, in which an axially-hollow or annular gudgeon 10 is inserted and secured to the drumhead liquid-tight. The gudgeon projects somewhat from the head of the drum and is supported and rotates on Babbitt-metal bearings 11, fixed on the frame. The aperture through the gudgeon 10 is of considerable diameter and affords an opportunity for placing the butter-working rollers in the drum and for operating them independently of the drum. The rear head of the drum is substantially integral and tight and is provided with an annular gudgeon 12, secured permanently on the head of the drum. This gudgeon also is supported and rotates on fixed Babbitt-metal bearings 13, the perimeters of the gudgeons 10 and 12 being formed with an annular groove, respectively, in which a corresponding and complementary construction of the bearings enters and prevents endwise movement of the drum on its bearings.

Within the drum longitudinal buckets 14 are provided, which are secured to the heads of the drum at little distances apart and near to the periphery; also a plurality of butter-working rollers 15 15, preferably corrugated and located near to and parallel with each other and with the axis of the drum, are journaled at their rear ends in a cross-head 16, provided with a journal 17, which extends through the rear head of the drum and has its bearing in a boss or box 18, fixed on the drumhead, and these rollers at their front ends are provided with journals 19 19, which extend through the central partial head 20 and have their bearings in the spider 21 and extend through the spider and into the extremities of the cross-bar 22, which is thereby mounted thereon. This cross-bar 22 is provided with a medial hub 23 concentric with the axis of the drum. Also there is a rigid frame in the drum, comprising the longitudinal bars 24 24, fixed at their extremities in the end pieces 25 25', the end piece 25 being secured rigidly to the inner surface of the partial head 20 and the piece 25' being secured on a cross-head 16. It is desirable to have the interior of the drum and the devices therein, so far as they are liable to come in contact with the milk, made of wood, and in constructing my machine the drum itself, including the periphery and its heads, is made of wood, and also the buckets 14, the rollers 15, the bars 24, the end pieces 25 25', and the interior disk or lining of the central head 20 are also all made of wood. The end piece 25' is so fitted on the metal cross-head 16 as to substantially cover it, except at the rear, where it is covered by a sheathing 26, of galvanized iron.

A cork gasket 27 is fixed in the annular inner end of the gudgeon 10, and the central head 20 is held tightly thereto, so as to become a rigid part of the drum when the machine is being used as a churn. This construction renders the front head liquid-tight, as the roller-journals 19 19 are suitably packed in this partial head by means of the stuffing-box plug-nuts 28 28. For securing the partial head 20 releasably to the drumhead it is clamped tightly against the cork gasket in the inner end of the gudgeon 10. For this purpose the spider 21, having preferably three radial arms, fits in and bears loosely against the outer end of the gudgeon 10, and a link 29, passing at one extremity around the wrist or eccentric of a cylinder 30, revoluble in bearings therefor in the spider, is secured at its other extremity to the partial head 20, adjustably by means of a wedge-shaped key 31, that passes movably through the link 29 and through suitable slots therefor in adjacent ears 32 32 on the partial head 20. The key 31 provides for adjusting the distance between the partial head and the spider and for taking up wear. The key is held releasably in place by a set-screw 33, turning through a lug on the partial head against the key. The disposition of parts is such that the cylinder 30 is in a substantially vertical position when the plane of the butter-working rollers 15 is horizontal, which is the position required for the rollers when the machine is being used as a butter-worker.

The upper end of the cylinder 30 is faced to adapt it to receive a wrench thereon for rotating it. A pin 34, inserted in and projecting from the cylinder, is adapted to contact with a stud 35, fixed in the spider, and prevent the further rotation of the cylinder in that direction. The pin 34, as shown in Figs. 8 and 9, is in the position with reference to the stud 35 that it occupies when the partial head is held tight against the head of the drum, the parts being in the positions shown in Fig. 6, and the pin 34 will prevent the swinging of the cylinder around unduly toward the left, so as to release the parts, but permits the eccentric to swing around slightly beyond the plane of the axis of the cylinder and the key 31, so as to lock the parts in position; also, the parts are so constructed that the end 36 of the link 29 will contact with the adjacent part of the spider when the pin 34 contacts with the stud 35, and thus doubly secure the parts against being released and against being broken. A pin 37 on the cylinder 30 is adapted, when the cylinder is rotated in the other direction, to contact with but rise over a stud 38, fixed in the spider, and drop down behind this stud, between it and the stud 35, thus locking the cylinder in the position it has when the partial head 20 is released from the drumhead. A key 39, slightly wedge-shaped and dovetailed in cross-section at one extremity, slides in a slot therefor in the spider, and is engaged by a wrist 40 on the lower end of the cylinder 30, and is adapted by the revolution of the cylinder to be thrown forward into a recess therefor in a part of the frame, and to be withdrawn therefrom by a reverse rotation of the cylinder. The construction is such that when the cylinder is rotated so as to release the spider and the partial head from clamping the gudgeon in the head of the drum the key 39 will be pushed into the recess in the frame, and the spider will be thereby slightly raised off from the gudgeon, so that its weight shall rest directly on the frame, and at the same time the spider and the partial head will be locked against revolution.

For revolving the drum an annular gear 41, of considerable diameter, is fixed on the front head of the drum concentrically therewith. A pinion 42, fixed on a shaft 43, meshes with the annular gear 41. The shaft 43 is provided with a loose band-wheel 44, and a clutch having friction-blocks 45, adapted to engage the rim of the band-wheel, is provided to clutch the band-wheel to a sleeve 48, loose on the shaft 43. The clutch is mounted on and actuated by a clutch-collar 46, splined on the sleeve 48, and the clutch is put into engagement with and released from the band-wheel 44 by shifting the collar on the sleeve by means of lever-handle 47, pivoted medially on the frame and provided with a finger that rides in an annular groove in the clutch-collar 46. A pinion 49 on the sleeve 48 meshes with a spur-wheel 50, fixed on the counter-shaft 51, and a pinion 52, fixed on the counter-shaft, meshes with a spur-wheel 53, loose on the shaft 43. A clutch-collar 54, splined on the shaft 43, is so arranged on the shaft as to be capable of being shifted into engagement with the sleeve 48, thereby clutching the sleeve to the shaft 43 or into engagement with the spur-wheel 53, thereby putting the band-wheel into operative connection with the shaft 43 through the counter-shaft 51. The clutch 54 is shiftable on the shaft 43 by means of the rock-shaft 63, journaled in the frame, which rock-shaft is provided at one extremity with furcate fingers that ride in an annular groove in the collar 54 and at the other end with a radial handle 64. The rock-shaft is locked in position by means of a swinging latch 65, pivoted on the frame and provided with recesses or notches that take the handle 64 therein.

The construction by which the band-wheel is put into operative connection with the shaft 43 directly through the sleeve 48 and clutch 54 produces a comparatively rapid revolution of the drum A, which is required when the machine is used for churning, and the construction by which the band-wheel 44 is put into active connection with the shaft 43 through the counter-shaft 51 produces a slow revolution of the drum, which is required when the machine is used for working butter.

Spur-wheels 55 55', respectively, on the journals of the rollers 15 mesh with each other, and a pinion 56, splined on the counter-shaft 51, is adapted to be put in mesh with the spur-wheel 55, and thereby communicate motion to the rollers from the counter-shaft. The motion thus communicated to the rollers causes them to rotate inwardly toward each other at the top and is used in working butter. A bar 57, slidable endwise on the frame, is secured thereto by a screw 58, that passes through a slot in the bar and turns into the frame and is provided with a downwardly-turned end or finger that rides in an annular groove in the hub of the pinion 56. A shifting lever-handle 59, pivoted medially on the frame at its inner end, is let into a slot therefor in the outer extremity of the bar 57, and is adapted for shifting the bar and the pinion 56 on the counter-shaft. A spring 60 is preferably interposed between the head of the screw 58 and the bar 57, whereby the bar is held yieldingly to its work.

When the machine is used as a churn, the partial head 20 is clamped to the head of the drum and the rollers 15 are whirled with the drum about its axis. This motion of the rollers is communicated thereto from the drum by means of and through the spider 21, in which the rollers are journaled at their front extremities, and as the work and strain thus put on the rollers are by reason of the large quantity of material in the churn sometimes very great it is desirable to transmit the same whirling movement to the rear end of the rollers, by suitable mechanism therefor, other than by means of the roller-frame in the drum, to prevent the twisting or torsion of the rollers and roller-frame. For this purpose a shaft 61 is provided, which shaft is journaled in brackets on the main frame and is provided with sprocket-wheels and sprocket-chains 62 62', running on the shaft 61, run also severally, one on a sprocket-wheel on the hub 23 at the front of the machine and the other on a sprocket-wheel on the journal 17 at the rear end of the machine.

The roller-carrying frame in the drum that includes the longitudinal bars 24 and their supports at each end is adapted not only to retain the parts in which the rollers are mounted in relative fixed positions, but is also adapted to serve as a hopper, when the machine is being used as a butter-worker, to receive the butter as it falls from the buckets and carry it onto the butter-working rollers. For this purpose the frame and rollers and allied parts are brought into the positions illustrated in Fig. 2 when the machine is to be used for working butter.

It is, however, not my purpose herein to claim, broadly, the features of a drum with one tight head and one head with a central aperture, in which drum a cross-head is journaled in the tight head, and in which drum there are rollers mounted at one end in said cross-head and at the other end in a spider fitted releasably to the other end of the drum, as that construction was not invented by me, but is included in an application for a patent heretofore filed by Charles S. Brown and Frank B. Fargo.

What I claim as my invention is—

1. The combination with a revoluble drum having a tight head and a head with a central aperture providing a passage into the drum closed by a releasable partial head, and large annular gudgeons fixed respectively one on and one in a head of the drum on which gudgeons the drum is supported and rotated; of a plurality of butter-working rollers in the drum parallel with its axis; a cross-head in the drum journaled in the tight head concentrically with but independently of the drum-supporting gudgeon at that end of the drum, in which cross-head the butter-working rollers are journaled at that end; and a spider fitted and supported releasably in the hollow gudgeon at the other end of the drum, in which spider the butter-working rollers are journaled at that extremity, substantially as described.

2. The combination with a revoluble drum having a substantially tight head and a head with a large central aperture; of a cross-head in the drum journaled in its tight head concentrically therewith; a spider fitted releasably in and supported on the other end of the drum; a plurality of butter-working rollers in and parallel with the axis of the drum, said rollers being journaled in said cross-head and said spider and revoluble therewith and independently thereof; a cross-bar on the journals of the rollers adjacent to the spider; sprocket-wheels respectively on a hub on the cross-bar and on the journal of the cross-head at the other extremity of the drum, said sprocket-wheels being concentric with the drum; a driven shaft near to and parallel with the drum; and sprocket-belts connecting said shaft operatively with said sprocket-wheels, substantially as described.

3. The combination with a revoluble drum having a substantially tight head and a head with a large central aperture; of a cross-head in the drum journaled in its tight head concentrically therewith; a spider fitted releasably in and supported on the other end of the drum; a plurality of butter-working rollers in and parallel with the axis of the drum, said rollers being journaled in said cross-head and said spider and revoluble therewith and independently thereof; a cross-bar on the journals of the rollers adjacent to the spider; sprocket-wheels respectively on a hub on the cross-bar and on the journal of the cross-head at the other extremity of the drum, said sprocket-wheels being concentric with the drum; a driven shaft near to and parallel with the drum; sprocket-belts connecting said shaft operatively with said sprocket-wheels; means for clamping said spider to the drum-head; and means for revolving the drum, substantially as described.

4. The combination with a drum having a tight head; of an annular gudgeon 12 fixed thereon; a journal-box fixed on the head of the drum within, concentric with and free from said gudgeon; and a roller-supporting cross-head in the drum provided with a journal having its bearings in the box aforesaid, substantially as described.

5. The combination with a revoluble drum having an enlarged central aperture in one head thereof, and an annular axially-hollow gudgeon fixed in the head about said aperture; of a partial head adapted to bear releasably against the inner end of the gudgeon and close the aperture into the drum; a spider adapted to bear against the outer end of said gudgeon; a cylinder journaled in the spider and provided with an eccentric wrist; and a link connected to said partial head and taking onto the wrist on said cylinder, substantially as described.

6. The combination with a revoluble drum having an enlarged central aperture in one head thereof, and an annular axially-hollow gudgeon fixed in the head about said aperture; of a partial head adapted to bear releasably against the inner end of the gudgeon and close the aperture into the drum; a spider adapted to bear against the outer end of said gudgeon; a cylinder journaled in the spider and provided with an eccentric wrist; a link taking onto said wrist; and a wedge-shaped key inserted adjustably in a slot in ears therefor on the partial head and through said link, substantially as described.

7. The combination with a revoluble drum having an enlarged central aperture in one head thereof, and an annular axially-hollow gudgeon fixed in the head about said aperture; of a partial head adapted to bear releasably against the inner end of the gudgeon and close the aperture into the drum; a spider fitted loosely in and adapted to bear against said gudgeon at its outer end; a cylinder journaled in the spider provided with a wrist and connecting-link adapted by the revolution of the cylinder to clamp the spider to and release it from the gudgeon, said cylinder being also provided with an eccentric stud-pin; and a sliding key in said spider adapted to be actuated by said stud-pin to lift the spider and its load from the gudgeon and to lock the spider and its load to the frame against revolution with the drum, substantially as described.

8. The combination with the spider 21 provided with a catch-pin 38 and a stud 35; of a cylinder 30 provided with a wrist adapted to serve as clamping or shifting means; and a pin 37 fixed in the revoluble cylinder, adapted to be lifted over and engaged releasably by pin 38 and to impinge against stud 35, substantially as described.

9. The combination with a revoluble drum provided with large annular gudgeons fixed concentrically therewith one on a tight head and the other in and about an aperture through the other head; of a cross-head in the drum journaled in the tight head thereof; a spider secured releasably in and to the gudgeon in the centrally-open head of the drum; a plurality of butter-working rollers journaled in said cross-head and in said spider parallel with the axis of the drum; gears on the journals of the rollers meshing with each other; a cross-bar mounted on the journals of the rollers adjacent to the spider, said cross-head being provided with a hub in the projection of the axis of the drum; a driven shaft parallel with the axis of the drum; sprocket-belts connecting said driven shaft operatively to the hub of said cross-bar and to the journal of the cross-head aforesaid; and means for revolving the drum and for rotating the rollers, substantially as described.

In testimony whereof I affix my signature in presence of two witnesses.

WILLIAM E. PENN.

Witnesses:
A. W. GREENWOOD,
N. H. HARRIS.